(12) United States Patent
Lapinski et al.

(10) Patent No.: US 7,571,028 B2
(45) Date of Patent: Aug. 4, 2009

(54) METHOD AND SYSTEM FOR AC POWER GRID MONITORING

(75) Inventors: Sterling Lapinski, Louisville, KY (US); Deirdre Alphenaar, Louisville, KY (US)

(73) Assignee: Genscape Intangible Holding, Inc., Louisville, KY (US)

( * ) Notice: Subject to any disclaimer, the term of this patent is extended or adjusted under 35 U.S.C. 154(b) by 462 days.

(21) Appl. No.: 11/109,149

(22) Filed: Apr. 19, 2005

(65) Prior Publication Data

US 2006/0235574 A1    Oct. 19, 2006

(51) Int. Cl.
G06F 19/00 (2006.01)
(52) U.S. Cl. .................................. 700/286; 702/57
(58) Field of Classification Search ......... 700/286–295; 702/57–62
See application file for complete search history.

(56) References Cited

U.S. PATENT DOCUMENTS

| | | | |
|---|---|---|---|
| 6,496,342 B1 * | 12/2002 | Horvath et al. ................. | 361/65 |
| 6,671,654 B1 * | 12/2003 | Forth et al. ................... | 702/182 |
| 6,714,000 B2 | 3/2004 | Staats | |
| 6,771,058 B2 | 8/2004 | Lapinksi et al. | |
| 7,043,340 B2 * | 5/2006 | Papallo et al. ................ | 700/292 |
| 7,110,231 B1 * | 9/2006 | De La Ree et al. ............ | 361/71 |
| 7,154,722 B1 * | 12/2006 | Stoupis et al. ................. | 361/62 |
| 7,254,001 B2 * | 8/2007 | Papallo et al. ................. | 361/64 |
| 2005/0033481 A1 * | 2/2005 | Budhraja et al. ............ | 700/286 |
| 2007/0150114 A1 | 6/2007 | Gardner et al. | |

OTHER PUBLICATIONS

B.J. Kirby et al., "Frequency Control Concerns in The North American Electric Power System," ORNL/TM-2203/41, paper prepared for the U.S. Department of Energy, Dec. 2002, 19 pages, Oak Ridge National Library, Oak Ridge Tennessee.

Johan Driesen et al., "Time-Frequency Analysis in Power Measurement Using Complex Wavelets," Jul. 2, 2002, pp. 681-684, IEEE.

Miroslav M. Begovic et al., "Frequency Tracking in Power Networks in the Presence of Harmonics," Apr. 1993, pp. 480-486, vol. 8, No. 2, IEEE.

A. G. Phadke, "Synchronized Phasor Measurements—A Historical Overview," Apr. 2, 2002, pp. 476-479, IEEE.

Adly A Girgis et al., "Adaptive Estimation of Power System Frequency Deviation and its Rate of Change for Calculating Sudden Power System Overloads," IEEE Transactions on Power Delivery, Apr. 1990, pp. 585-594, vol. 5, No. 2, IEEE.

Enetics, "Power Quality Monitoring," Power Web Demo, downloaded at http://www.enetics.com/app-PQM.html on Jul. 18, 2005.

(Continued)

*Primary Examiner*—Kidest Bahta
(74) *Attorney, Agent, or Firm*—Stites & Harbison, PLLC; David W. Nagle, Jr.; Jeffrey A. Haeberlin

(57) ABSTRACT

A method and system allows for substantially real-time monitoring of the operational dynamics of power plants and other components comprising an AC power grid, by using information collected from a network of power grid frequency detection and reporting devices. The invention allows for the substantially real-time detection and reporting of certain power grid events such as power plant trips.

38 Claims, 11 Drawing Sheets

OTHER PUBLICATIONS

Softswitching Technologies, "What is the I-Grid?," web site, downloaded at http://www.softswitch.com/IGrid/tabid/58/Default.aspx on Jul. 18, 2005.

Dennis Erickson et al. "Pacify the Power," GPSWorld, Apr. 1, 2005, downloaded at http://www.gpsworld.com/gpsworld/article/articleDetail.jsp?id=154868&pageID=1&sk=&date, Questex Media Group.

Electric Power Group, LLC, Area Control Error (ACE) and Frequency Real Time Monitoring System, "Completion Summary Report of Program Software," prepared for CERTS and NERC, Oct. 18, 2002, downloaded at http://certs.lbl.gov/pdf/ACE.pdf.

Virginia Tech, "Power IT Lab" web site, downloaded at http://www.powerit.vt.edu/main.htm on Jul. 20, 2005.

Virginia Tech, "Frequency Monitoring Network—GPS/Internet-Based Frequency Monitoring Network (FNET) Design—Abstract of the System", http://www.powerit.vt.edu/FNET.htm, Jul. 20, 2005.

Yilu Liu, "GPS/Internet Based Frequency Monitoring Network (FNET)," presentation downloaded at http://www.powerit.vt.edu/FNET/ATP_PJM_Liu_VT.pdf.

Virginia Tech, "Frequency Monitoring Network—Overall Architecture," http://www.powerit.vt.edu/FNET/02-1overalll_architecture.htm, Jul. 20, 2005.

Virginia Tech, "Frequency Monitoring Network -Communication Architecture," http://www.powerit.vt.edu/FNET/02-2communication1_architecture.htm, Jul. 20, 2005.

Virginia Tech, "Frequency Monitoring Network -Information Management," http://www.powerit.vt.edu/FNET/02-3information_management.htm, Jul. 20, 2005.

Virginia Tech, "Frequency Monitoring Network -Frequency Disturbance Recorder (FDR) Hardware," http://www.powerit.vt.edu/FNET/03-1FDR-hardware.htm, Jul. 20, 2005.

Virginia Tech, "Frequency Monitoring Network -Real-Time Web Display," http://www.powerit.vt.edu/FNET/04-real-time_web_display.htm, Jul. 20, 2005.

Virginia Tech, "Frequency Monitoring Network -FDR Measurement Analysis," http://www.powerit.vt.edu/FNET/05-1fdr_measurement_analysis.htm, Feb. 25, 2005.

Virginia Tech, "Frequency Monitoring Network -Frequency Wave Propagation," http://www.powerit.vt.edu/FNET/05-2-Application-frequency_wave_propgation.htm, Feb. 25, 2005.

Virginia Tech, "Frequency Monitoring Network -Frequency Wave Speed," http://www.powerit.vt.edu/FNET/05-3-Application-frequency_speed.htm, Feb. 25, 2005.

Virginia Tech, "Frequency Monitoring Network -Ongoing Research," http://www.powerit.vt.edu/FNET/06-Rersearch_ongoing.htm, Jul. 20, 2005.

Virginia Tech, "Frequency Monitoring Network -Present Participants", http://www.powerit.vt.edu/FNET/07-1-Present%20participants.htm, Jul. 20, 2005.

Virginia Tech, "Frequency Monitoring Network -Sponsors", http://www.powerit.vt.edu/FNET/08-sponsors.htm, Jul. 20, 2005.

Virginia Tech, "Frequency Monitoring Network -Undergraduates Build Equipment to Monitor Power Grid", http://www.powerit.vt.edu/FNET/Undergrad_Project.htm, Feb. 25, 2005.

North American Energy Standards, "Policy 1—Generation Control and Performance," version 2, Oct. 8, 2002, pp. p1-1 to p1-18, downloaded at [http://www.naesb.org/pdf/weq_mos012403w3.pdf].

United States Patent and Trademark Office as International Searching Authority, PCT International Search Report for International application No. PCT/US05/13213, Jul. 7, 2006, pp. 1-6.

* cited by examiner

US 7,571,028 B2

METHOD AND SYSTEM FOR AC POWER GRID MONITORING

CROSS-REFERENCE TO RELATED APPLICATIONS

None.

BACKGROUND OF THE INVENTION

A. Field of the Invention

This invention relates to AC power grid monitoring. More particularly, the invention relates to a method and system for substantially real-time monitoring of the operational dynamics of the components comprising an AC power grid by using information collected from a network of power grid frequency detection and reporting devices.

B. Description of Related Art

Information about the operation of the power grid is valuable to utilities, power generators and power transmission operators for reliability reasons, but this information is also valuable to a broader range of participants for economic reasons. For instance, such information is particularly valuable to companies engaged in the business of buying and selling electricity on the open market. However, power plant operators currently do not release this information to other participants in the market.

Reporting systems that communicate information about the operations of the power grid to various end users exist, such as those described in U.S. Pat. Nos. 6,714,000 and 6,771,058, but there are limitations to their usefulness. The systems described in U.S. Pat. Nos. 6,714,000 and 6,771,058 require substantially unobstructed access to high-voltage transmission lines. Certain power grid components in particular locations can not be effectively monitored using such systems. For example, high-voltage transmission lines may not be accessible in all locations.

AC power grid operations require that power generation and consumption be continuously and instantaneously balanced. This balance is necessary for maintenance of key operational parameters, i.e., voltage and frequency, of the power grid at acceptable levels. A perfect generation and consumption balance is not practical, so power grids are designed to allow for certain deviations in the key operational parameters. Deviations in power grid frequency are created primarily when power generation and power consumption load deviate from balance. Active control systems continually strive to achieve balance by adjusting the power output of electricity generators in response to changes in consumption load, using power grid frequency as the governing signal. Small imbalances in generation and consumption load result in small, operationally acceptable deviations in the frequency of the power grid from the desired frequency, generally either 50 Hz or 60 Hz. The sudden loss of a generator or disruption in another significant power grid component, such as a high-voltage transmission line, can cause larger-than-average imbalances between generation and consumption load, and hence, larger deviations in frequency. Power grid operators regulate the maximum deviation in frequency and the maximum time to recover to equilibrium frequency conditions permitted during such events, and use the power grid frequency as an indicator of the operational balance between power generation and consumption across the power grid. Thus, it is clear that power system frequency contains useful information about the operation of the power grid.

Current methods for measuring and monitoring AC power grid frequencies employing triangulation techniques generate data for historical analysis of operation of the AC power grid. For instance, the art describes using data from networks of frequency monitors to analyze the effects of power grid events such as power plant trips and transmission line disruptions on the temporally dynamic frequency at many points on the grid, to model the results of such events, and to propose operational changes to power system components that would most effectively maintain power grid stability.

However, there is currently no method or system for real-time monitoring and reporting of the operational dynamics of the components of an AC power grid using such frequency data.

Thus, there is a need for a method and system for substantially real-time monitoring of the operational dynamics of the components of an AC power grid.

SUMMARY OF THE INVENTION

The present invention meets this need, and others, as will become readily apparent and addressed through a reading of the discussion below.

The present invention is a method and system that allows for determination of certain operational dynamics of power plants and other AC power grid components using information collected from a network of power grid frequency detection and reporting devices. The invention allows for the substantially real-time detection and reporting of power grid events such as power plant trips. Substantially real-time detection and reporting is defined as sub-second to no longer than several minutes following a power grid event. The method and system of the present invention employ a network of frequency monitors to identify certain power grid events in substantially real-time and communicate the location and nature of such events to end users, and in particular, to end users that otherwise do not have substantially real-time access to information about the operations of certain power grid components. The location and nature of a power grid event is determined by interpreting the frequency deviation detected and reported by one or more of the frequency monitors, using a network model that provides information representative of the propagation characteristics of frequency deviations caused by power grid events. The location of an event is also associated with a particular power grid component, such as an identified power plant, further increasing the economic value of the information created. The present invention, while only capturing information on a subset of power grid events, nonetheless can operate more effectively than existing systems under certain important conditions.

DETAILED DESCRIPTION OF EXEMPLARY EMBODIMENTS

Generally, power system frequency information is used to monitor the status of an AC power grid, and this information is then used to make operational changes to individual power grid components to maintain appropriate power grid frequency. However, as described herein, this power grid frequency information may also be used to determine the operational dynamics of specific components of the power grid under certain conditions. Generally, operational dynamics may include power generation facility status and output, transmission line status and load, or other relevant power system operational parameters. In particular, when large operational changes occur with power grid components such as power generating plants within time frames that are shorter than the power grid operators' ability to respond with compensating actions, frequency deviations large enough to be discriminated from frequency background noise (said background noise being the result of many small continuous changes at all the other power grid components) are generated. Thus, certain power grid events, such as power plant trips or high-voltage transmission line failures, create information that can be extracted from measurements of power grid frequency. These events can be statistically identified in power grid frequency measurement data, and information such as the size of the event (e.g., the amount of megawatts of generation lost during a plant trip) may be inferred from the frequency change.

Figure 1:
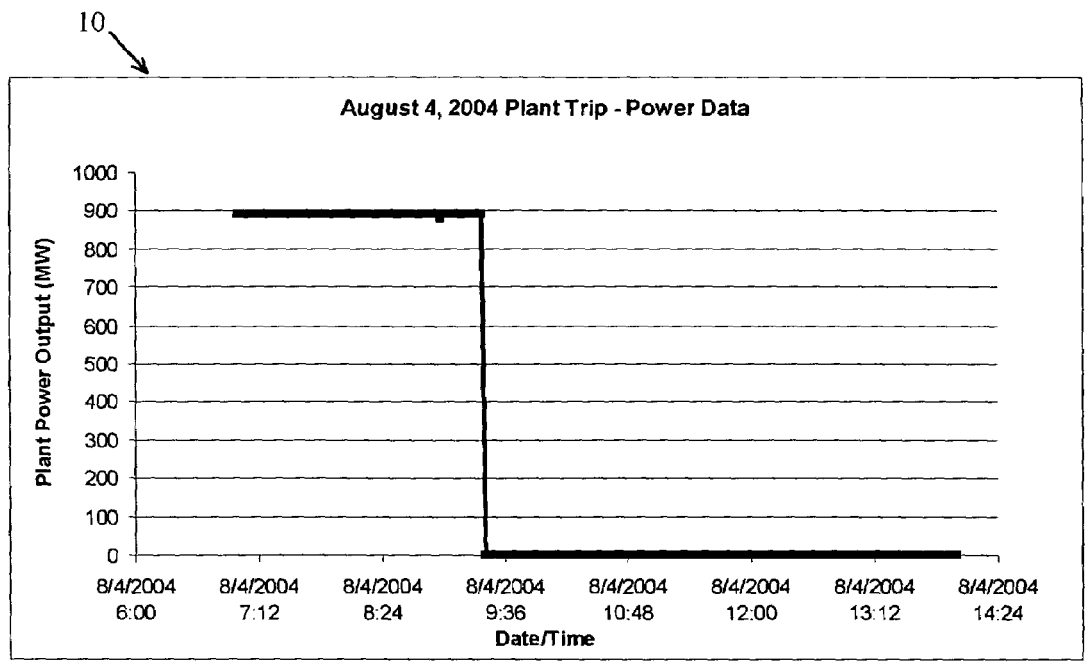
FIG. 1 is a graph of the data from a reporting system that recorded the loss of a generator at a power plant.
Figure 2:
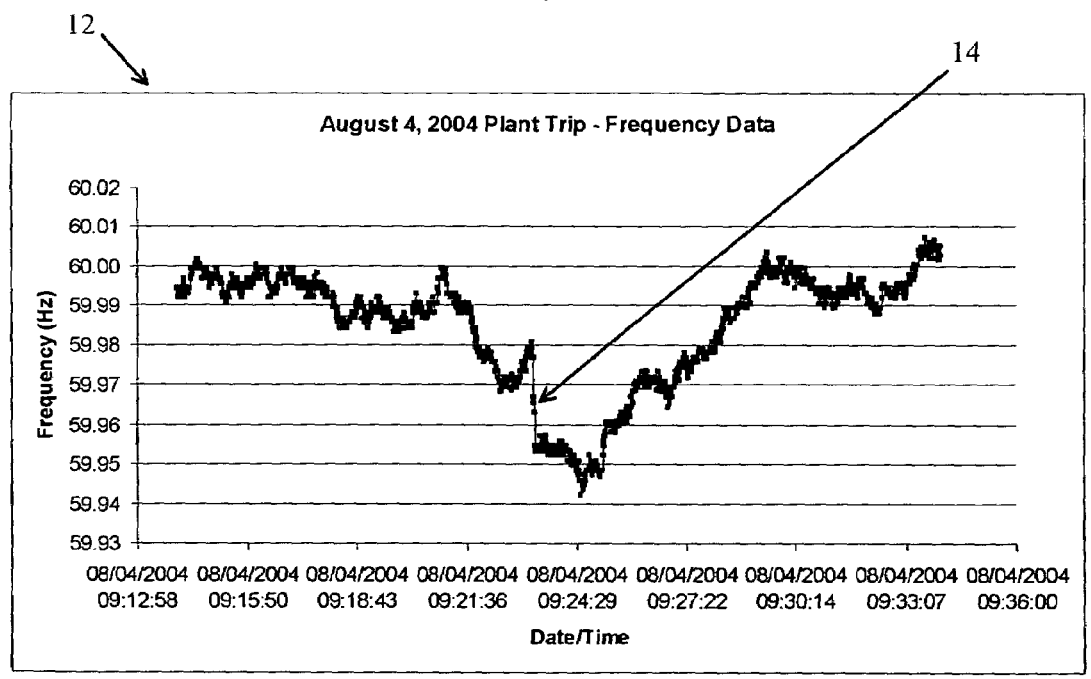
FIG. 2 is a graph of frequency data measured at a power outlet including the time of the generator loss recorded in FIG. 1.

For example, FIG. 1 and FIG. 2 illustrate the effect of a power plant trip. FIG. 1 shows a graph 10 of the data from a reporting system, such as described in U.S. Pat. Nos. 6,714,000 and 6,771,058, that recorded the sudden loss of a 925 megawatt generator at a power plant in Oak Harbor, Ohio, on Aug. 4, 2004 at 9:23 a.m. FIG. 2 shows a graph 12 of frequency data measured at a power outlet location in Louisville, Ky. for a similar time period. The large and sudden drop 14 in measured frequency shown on the graph 12 of frequency data at about 9:23 a.m. is the result of the Oak Harbor generator trip.

Power grid frequency deviations propagate across an AC power grid at finite speeds, in accordance with the characteristics of that AC power grid. The characteristics of the power grid are determined by the power grid components comprising the network, the network architecture, and the physical state of the components that comprise the complex network of the power grid. For the purposes of this discussion, power grid components are any physical entities associated with an AC power grid. The primary components of power grids of interest to the current invention are power generating facilities, power transmission lines, voltage transformers, substations, and loads. The network architecture includes power line segment lengths, interconnection patterns, and the location of transformers, loads and generators. The physical state of the components includes power line loads, power phase, voltage levels, generator outputs, and power consumption rates. The specific parameters associated with a power grid are determinable using any of a variety of power system models, for example, those models commercially available from Power World Corporation of Champaign, Ill.

Power grid frequency deviations are created by certain operations of the power grid components, such as an increase in power consumption at a load point or a change in power output from a power generation facility, and these deviations propagate throughout the grid until a new instantaneous equilibrium frequency is established. In practice, the result of the many small, continuous deviations in power grid component operations eliminates the possibility of true equilibrium, so an AC power grid is operated to maintain dynamic equilibrium with a narrow acceptable band of frequencies. Large deviations in frequency, however, propagate across an AC power grid with sufficient equilibrium disruption that they may be measured at different points of the grid with identifiably different times.

As indicated previously, many operational dynamics affect power system frequency. Although the examples provided herein describe frequency disruptions caused by events such as power plant trips, the methods described herein may be employed to monitor much less significant power grid events, dependent only upon the quality of the information available. Thus, although this invention contemplates measuring and reporting significant power grid events, the invention may be employed to measure a broad range of power system operational dynamics (for example, events as inconsequential as the turning on of a single light bulb, given sufficient information input) without departing from the scope of the teaching herein.

Figure 3:
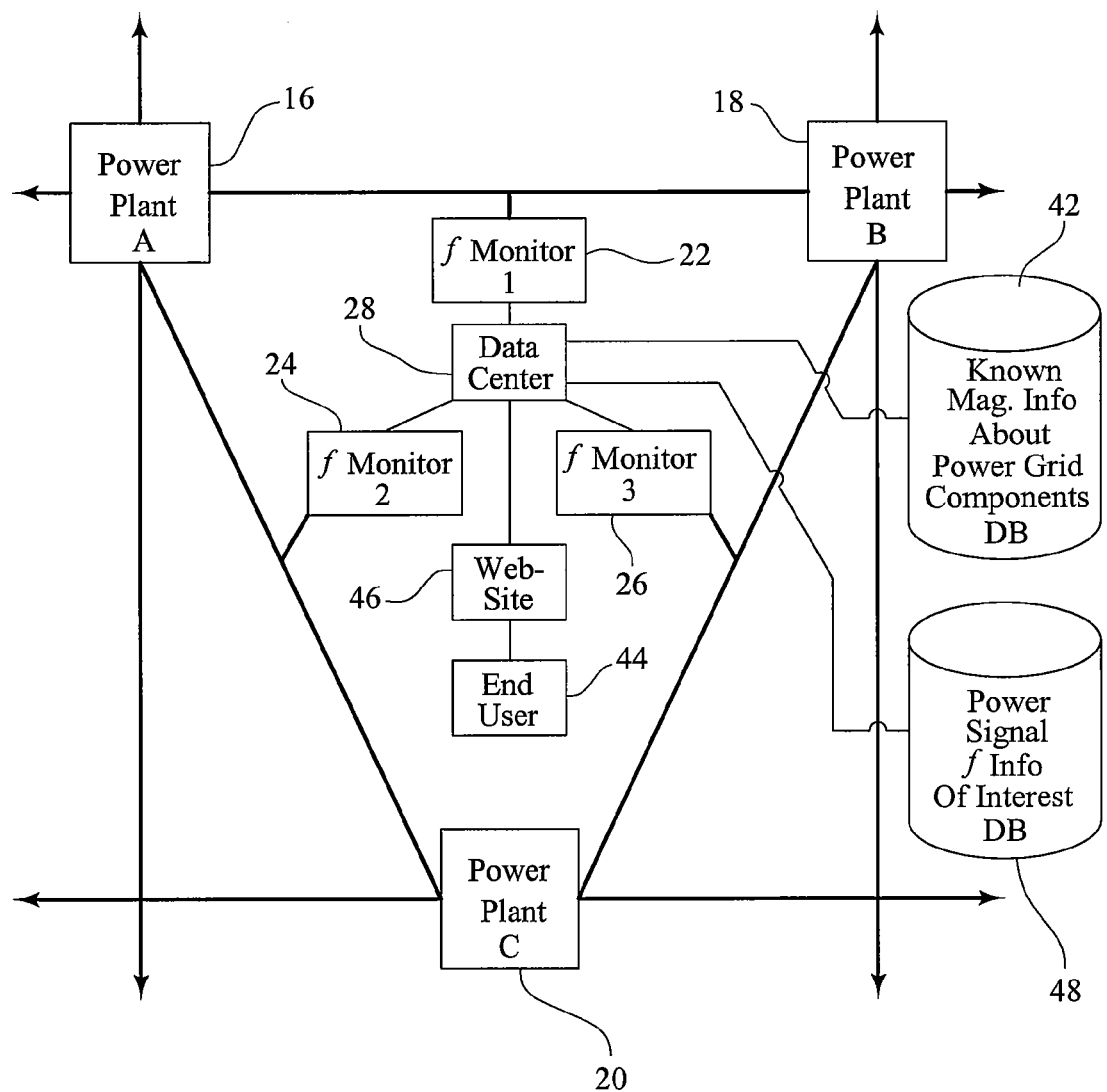
FIG. 3 is a block diagram of an exemplary system for substantially real-time monitoring of the operational dynamics of the components of an AC power grid.

FIG. 3 is a block diagram of an exemplary system for substantially real-time monitoring of the operational dynamics of the components of an AC power grid. The power grid consists of power plants 16, 18, 20 interconnected by transmission and distribution lines. In this particular embodiment, the system has a plurality of power system frequency detection and reporting devices, or frequency monitors 22, 24, 26 connected to the AC power grid at known monitoring locations, for obtaining power signal frequency information at the known monitoring locations. The frequency monitors 22, 24, 26 are connected, or networked, to a central data center 28. Preferably, the frequency monitors 22, 24, 26 are connected to power outlets or other power grid components, such that reliable measurements of the power signal frequency information at each location are obtained.

Figure 4:
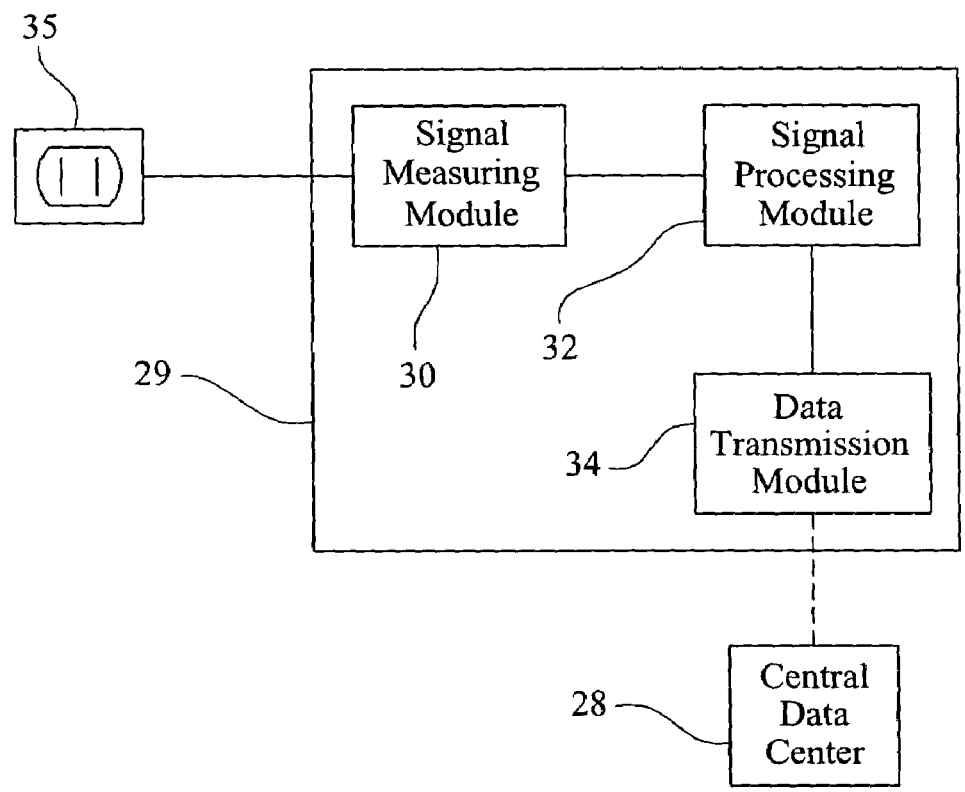
FIG. 4 is a block diagram of an exemplary frequency monitor.

FIG. 4 is a block diagram of an exemplary frequency monitor 29 having a signal measuring module 30, a signal processing module 32, and a data transmission module 34. Each such frequency monitor 29 is preferably connected to a power outlet 35 such that the local frequency of the power grid at the location of the monitor can be reliably detected. In this regard, it is contemplated that various commercially available frequency monitors could be used to achieve the objectives of the present invention, for example, those sold by Arbiter Systems of Paso Robles, Calif., or Reliable Power Meters Everett, Wash. The frequency monitor can collect and record such power signal frequency information either continuously or discretely. In the signal measuring module 30, the AC power signal waveforms measured at the power outlet are preferably attenuated from grid level voltage levels (110V in the United States and North America, 220V in Europe). The signal processing module 32 digitizes the raw AC power signal waveform, applies a time code derived from a reliable time source such as GPS or atomic clock radio transmissions, and prepares the processed data for transmission. Finally, the data transmission module 34 provides for the communication of the digitized data to the central data center 28 (see FIG. 3). Preferably, data is transmitted via landline transmission means, such as ethernet. Of course, various other data transmission techniques could be employed without departing from the spirit and scope of the present invention, including, but not limited to, wireless, satellite communications, microwave communications, and/or a fiber optic link or similar landline transmission.

FIG. 5 through FIG. 10 are logic flow charts showing some of the steps of an exemplary method for substantially real-time monitoring of the operational dynamics of the components of an AC power grid, according to the invention, including: S100 obtaining power signal frequency information for the AC power signal at a plurality of known monitoring locations on said AC power grid in substantially real-time; S102 analyzing said power signal frequency information for an indication that a power grid event has occurred on said AC power grid; S104 identifying in substantially real-time a power grid component that is the source of the power grid event using said power signal frequency information; and S106 communicating the identity of the source power grid component to an end user, such that the user is able to know in substantially real-time the source and magnitude of the power grid event.

Figure 6:
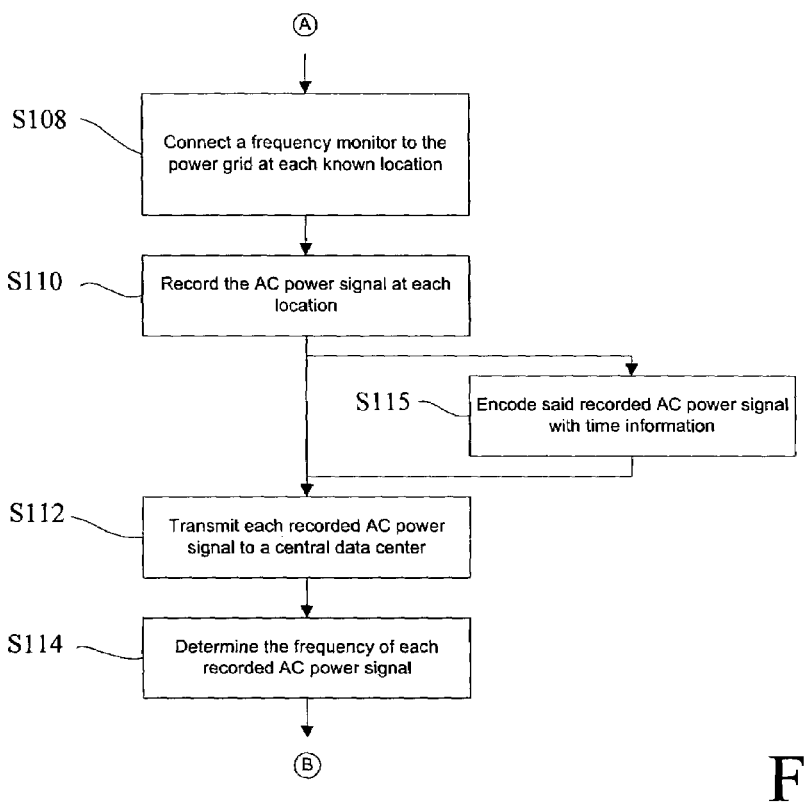

An initial step is S100 obtaining power signal frequency information for the AC power signal at a plurality of known monitoring locations on the AC power grid in substantially real-time. This step S100 may be accomplished by using a plurality of power system frequency monitors, as described above, or by receiving such information from an entity or entities that have already deployed a similar network. In the former case, the method includes, as shown in FIG. 6, the steps of: S108 connecting a frequency monitor to said AC power grid at each of said plurality of known monitoring locations; S110 recording the AC power signal at each location; S112 transmitting each said recorded AC power signal to a central data center; and S114 determining the frequency of each said recorded AC power signal. Preferably, as mentioned above, accurate timing information, or time coding, is encoded with the recorded AC power signal so that the signals from multiple locations may be accurately compared as any frequency deviations propagate across the AC power grid. Thus, the method may also include the step of S115 encoding the recorded AC power signal with time information.

Figure 11:
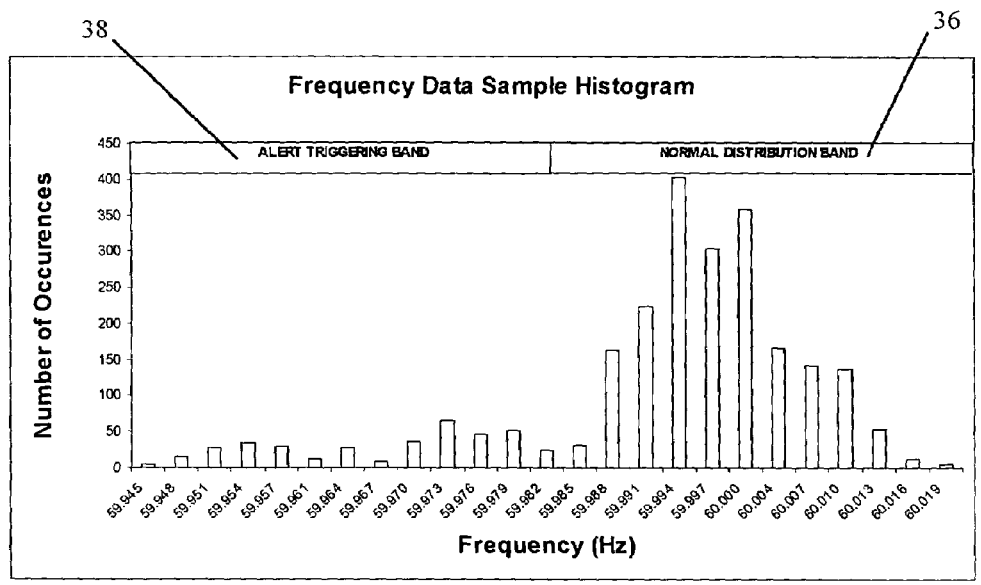
FIG. 11 is a frequency data sample histogram illustrating a normal distribution frequency band and an alert condition frequency band.
Figure 12:
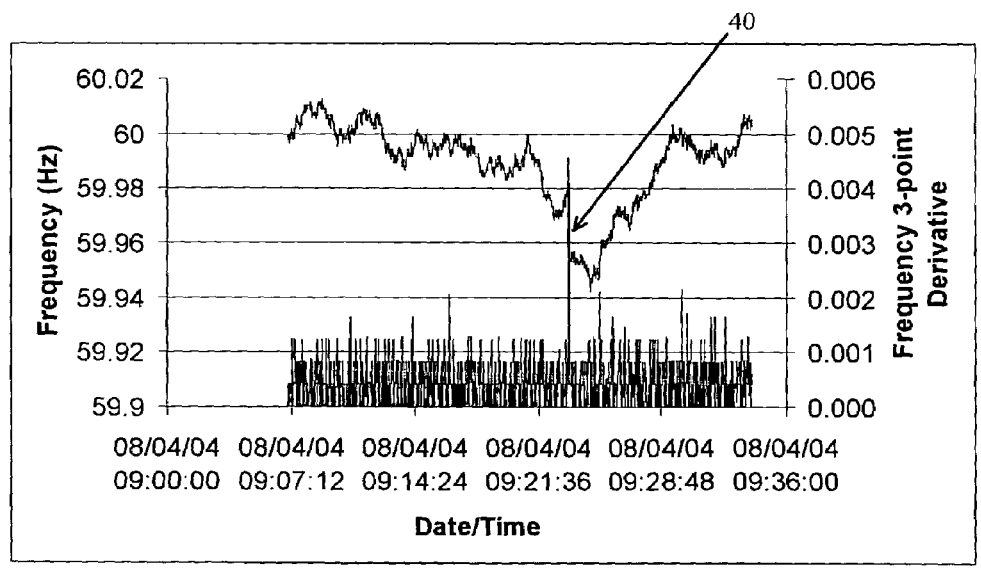
FIG. 12 is a graph of the frequency data of FIG. 2 and a frequency 3-point derivative analysis of the data.

Once the power signal frequency information is obtained, a following step S102 is to analyze the power signal frequency information for an indication that a power grid event has occurred on the AC power grid, or that there is a deviation from equilibrium frequency conditions. In order to achieve substantially real-time reporting of the power grid event, an automated frequency deviation detection method is employed. FIG. 11 and FIG. 12 illustrate two such methods that allow the automated detection of the power grid event. FIG. 11 shows a frequency distribution analysis on the data and defines a frequency band 36 which indicates the normal distribution of measured frequencies and a frequency band 38 which indicates alert conditions. Frequencies falling outside the normal distribution band 36 are used to define frequencies which will trigger automated event alerts. FIG. 12 shows a derivative analysis of the frequency data to detect the power grid event. The data from the Aug. 4, 2004 power plant trip scenario mentioned above with reference to FIG. 1 and FIG. 2 is used for this illustration. The particular rate of change of frequency 40 associated with the power grid event is greater than the normal rate of frequency change for non-event conditions. Of course, various other data processing techniques can be employed to produce automated frequency deviation detection without departing from the spirit and scope of the present invention, including, but not limited to frequency event pattern recognition, frequency event duration time and frequency event recovery time analysis. The above methods are based on automated alerting of deviations occurring in the frequency data derived from AC power signal waveforms. In this respect, various signal processing techniques can be applied to analyze the raw AC power signal waveforms in order to detect shifts in waveform frequency without departing from the spirit and scope of the present invention, including, but not limited to phase shift analysis and signal cross-correlation.

Figure 8:
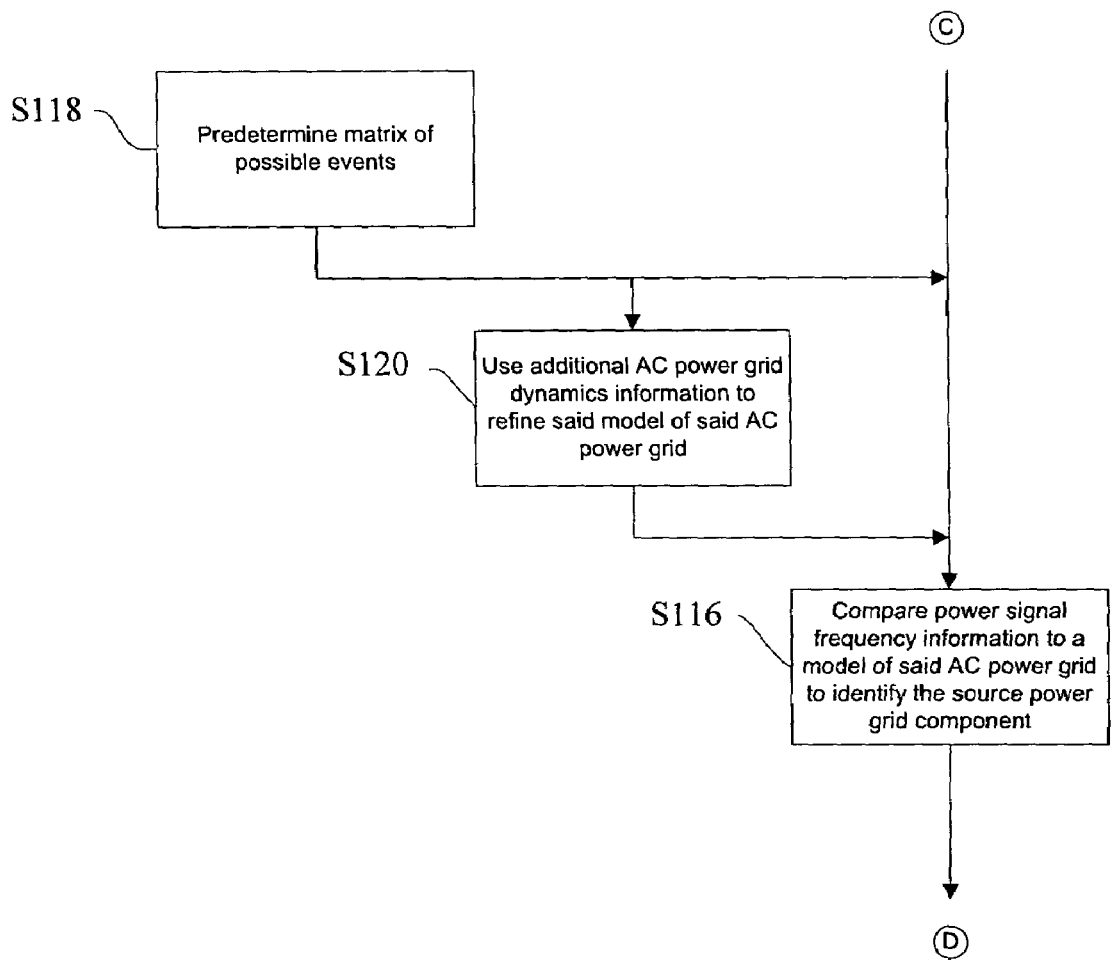

Returning now to FIG. 5, the step of S104 identifying in substantially real-time a power grid component that is the source of the power grid event, is accomplished by comparing the time coded frequency information from two or more frequency monitors, and then employing mathematical techniques to determine the original source of the frequency deviation being observed. One such technique is to first employ a simplified network model of the AC power grid being monitored and identify all power grid components that are likely sources of significant frequency deviations (generally, but not limited to, power generating facilities). Network models of AC power grids are available commercially from companies such as Power World Corporation of Champaign, Ill., and may be employed to good effect, but in this exemplary embodiment, a simplified model is employed to maximize computational speed. A key element of such models is that they capture the concept of propagation speed. Running the model under measured or assumed conditions puts the various power grid components into a particular solution state with respect to the key model parameters, and then changing the values associated with a particular power grid component and iterating the model though a series of small time steps will create a power grid frequency deviation propagation pattern across the model. This pattern of power grid frequency deviation propagation can then be matched to actual measured values to identify the power system component location and size of event that caused the propagation. This technique is shown in FIG. 8 as including the step of S116 comparing said power signal frequency information to a model of said AC power grid to identify the power grid component that is the source of the power grid event.

Figure 13:
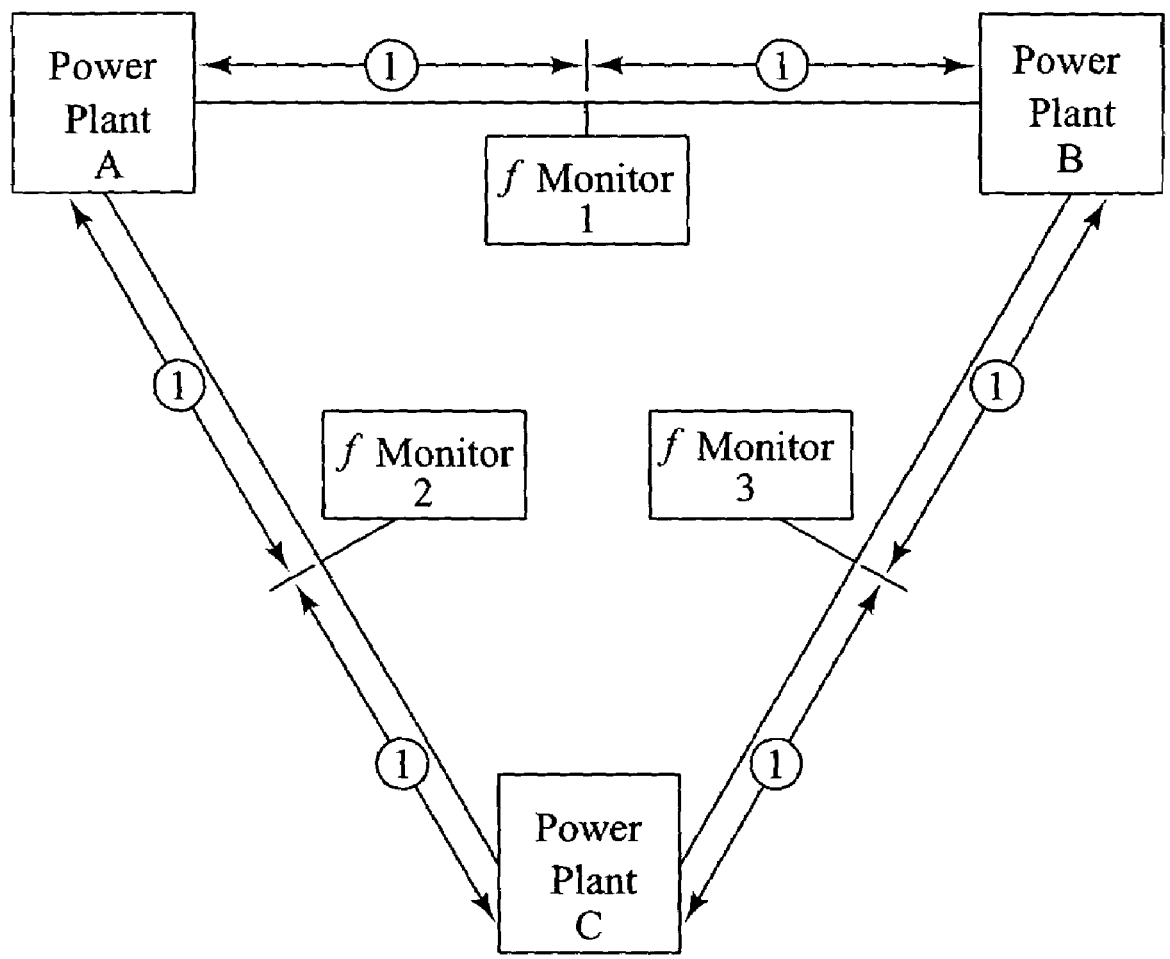
FIG. 13 is a schematic diagram of a six component AC power grid.

An example of this technique for a six power system component (three power generating facilities and three power transmission lines) AC power grid is adequate to demonstrate in all material respects the function and operation of these models in general. FIG. 13 is a schematic diagram of such a simplified network. Power system events may occur at Plant A, Plant B or Plant C, creating power frequency deviations that will be detected at frequency Monitor 1, Monitor 2 and Monitor 3. The propagation time from each Plant to each Monitor is determined by running a power flow model with inputs approximate to the current conditions on the AC power grid being modeled, creating in turn an event (for example, when a plant trips to zero power output) at each Plant, running the model in sufficiently small time incremental steps, and recording the propagation time for each event from each Plant to each Monitor. This propagation time, which varies according to the physical geometry of the AC power grid and parameters associated with each power grid component, as described previously, is termed the "propagation distance" from each Plant to each Monitor. Under an assumed set of conditions, the propagation distances (expressed in seconds) for the model is as follows:

TABLE 1

| Propagation Distance | Plant A | Plant B | Plant C |
|---|---|---|---|
| Monitor 1 | 1 | 1 | 3 |
| Monitor 2 | 1 | 3 | 1 |
| Monitor 3 | 3 | 1 | 1 |

To interpret the data from the frequency monitors, a table of propagation distance differences is useful, because the time associated with the first detection at any frequency monitor of a frequency deviation is labeled time zero. Thus, the matrix of propagation distance differences (expressed in seconds) is as follows:

TABLE 2

| Propagation Distance Differences | Plant A | Plant B | Plant C |
|---|---|---|---|
| Monitor 1 | 0 | 0 | 2 |
| Monitor 2 | 0 | 2 | 0 |
| Monitor 3 | 2 | 0 | 0 |

It is clear that for each Monitor, an event at any Plant creates a unique array of propagation distance differences. Thus, by running the power flow model for an AC power grid at appropriate intervals with adequate input values for the state of the components associated with an AC power grid, unique arrays of propagation distance differences may be created and maintained for any set of power system components. The advantages of this approach are that computation times are reduced when processing measured frequency deviations from the actual network of frequency monitors, although other approaches may be employed without departing from the spirit of the invention.

When frequency deviations are measured at two or more monitoring locations, the transmitted data may be used to identify the source of the event. In this example, the deviation identifying process described earlier in this document determines that significant deviations, which are likely associated with an event, occurred at the following times for each Monitor:

TABLE 3

| Monitor | Time of Deviation Detection |
|---|---|
| 1 | 12:00:00 |
| 2 | 12:00:00 |
| 3 | 12:00:02 |

By comparing the times of the deviations detected at each Monitor, it can be readily ascertained that the event occurred at Plant A, since its array of frequency propagation differences for the Monitors 1, 2, 3, is (0, 0, 2). Of course, in practice, the network models employed may be substantially more complex than illustrated in this example.

Thus, returning to FIG. 8, the technique of comparing frequency information to a model of the AC power grid can further include the step of S118 predetermining a matrix of possible events as the AC power grid model. Still further, the model can be enhanced using the step of S120 using additional AC power grid dynamics information to refine the model of the AC power grid. The inclusion into the power grid model of near real-time data about the physical state of various power system components, such as current generator output levels, transmission line flows, etc., can significantly increase the accuracy of the power grid model when determining parameters such as propagation distances.

Because of uncertainty in the power flow models resulting from imprecise AC power grid physical data, partial or inaccurate values associated with key power grid components, and timing errors or statistical uncertainty in frequency deviation identification (collectively "error sources"), the results from actual measured values will not precisely match the propagation distance differences from the model (or other equivalent measures from other modeling techniques). In certain cases, these error sources do not corrupt the signal sufficiently to disrupt the operation of the model, but in other instances, it may not be possible to make exact model determination of the desired information. In these latter cases, fitting algorithms or other techniques can be used to deduce the most likely sources of power grid events.

Figure 9:
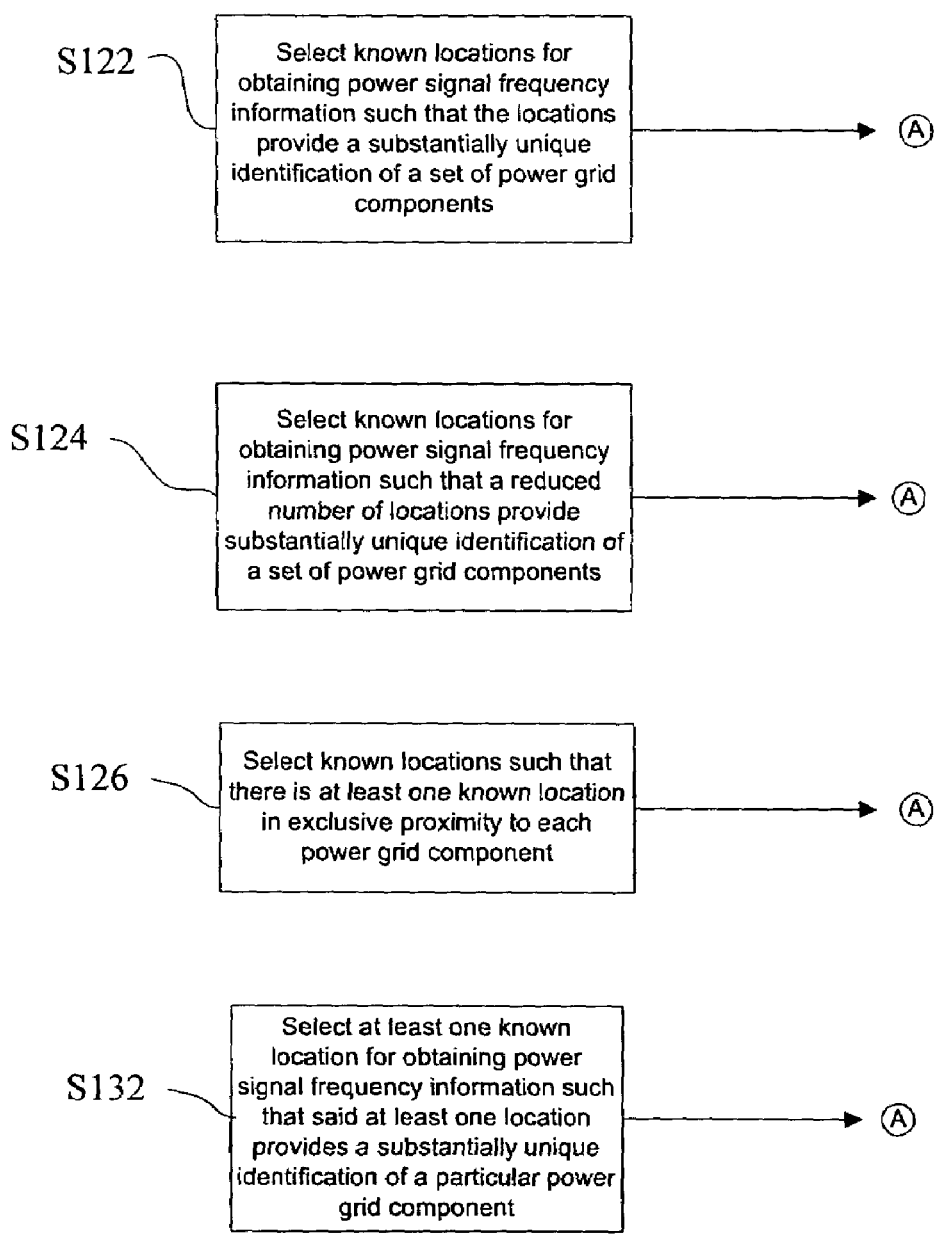

Preferably, the operator of the system selects locations for the frequency monitors in such a fashion that frequency information from two or more frequency monitors is sufficient to identify one of the components as a source component in the event that component causes a power grid event. This can be achieved by calculating the propagation distances for the frequency monitor for each power grid component of interest and ensuring that a sufficient number of these distances are unique or adequately different. Depending on the frequency monitor location, AC power grid physical properties, and power grid conditions, a relatively small number of monitors may provide information adequate to uniquely identify power grid events at a relatively large number of power grid components. In some cases, however, more monitors may be required. Thus, a preliminary step, as shown in FIG. 9, may be S122 selecting known monitoring locations for obtaining power signal frequency information such that the locations provide a substantially unique identification of a set of power grid components. This can be achieved by various methods, including running model simulations with different frequency monitor placement on the AC power grid to ensure that substantially unique identification is achievable.

By various optimization techniques, the number of frequency monitors may be reduced to a minimum amount. The preferred method for this invention is to first determine monitor placement based on educated opinion, then run the model through many simulations changing monitor placement and number of monitors until the optimization constraints are satisfied, although other techniques may be employed (such as genetic algorithms) without departing from the spirit of the invention. Thus, the preliminary step may include S124 selecting known monitoring locations for obtaining power signal frequency information such that a reduced number of locations provide a substantially unique identification of a set of power grid components.

Figure 7:
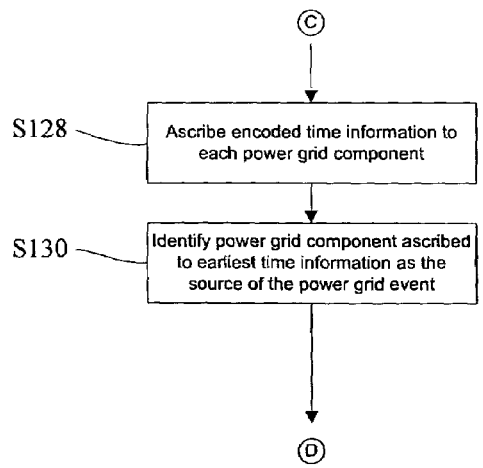
Figure 14:
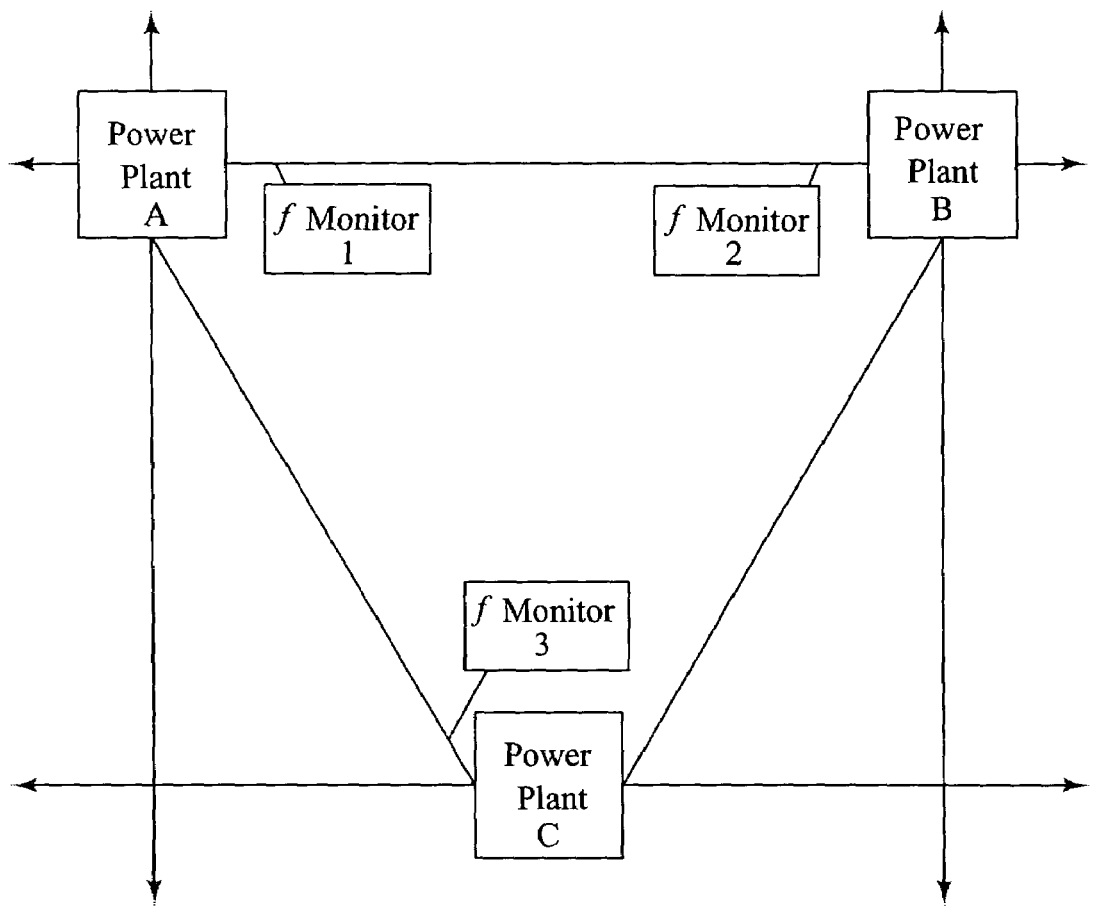
FIG. 14 is a schematic diagram of a portion of an AC power grid having frequency monitors in exclusive proximity to particular power grid components of interest.

An alternate technique for selecting frequency monitor location that allows for great precision in determining the location of power system events at particular power system components, but at the expense of the need for a larger group of monitors, is to locate a frequency monitors sufficiently and exclusively close to each particular power grid component. Sufficient and exclusive proximity to the power grid component is defined such that when an event occurs with that component, the frequency monitor with sufficient and exclusive proximity will always detect the deviation first. In other words, a monitor is placed "next to" each component of interest, so that the propagation distance between the power grid component and said monitor is smaller than the propagation distance between the power grid component and all other frequency monitors on the network. In this way the signal from as few as two devices may be used to determine the identity of a power grid event source component. An example of such a configuration is shown in FIG. 14, where frequency monitor 1 is in exclusive proximity to power plant A, frequency monitor 2 is in exclusive proximity to power plant B, and frequency monitor 3 is in exclusive proximity to power plant C. Thus, as represented in FIG. 9, the preliminary step may alternately include S126 selecting the known monitoring locations such that there is at least one known location in exclusive proximity to each of the power grid components. Then, by ascribing encoded time information for each frequency monitor to the corresponding power grid component, the power grid component ascribed to the earliest time information for a power grid event can be identified as the source of the power grid event. These steps are shown in FIG. 7 as S128 ascribing encoded time information to each power grid component, and S130, identifying the power grid component ascribed to the earliest time information for the power grid event as the source of the power grid event.

Additionally, the techniques for selecting frequency monitor locations could also be combined, selecting locations such that an overall reduced number of locations provides a substantially unique identification of the power grid components, but selecting at least one known location such that the location provides a substantially unique identification of a particular power grid component. Thus, the preliminary step, shown in FIG. 9, may also include S132 selecting at least one known location such that the location provides a substantially unique identification of a particular power grid component.

Figure 5:
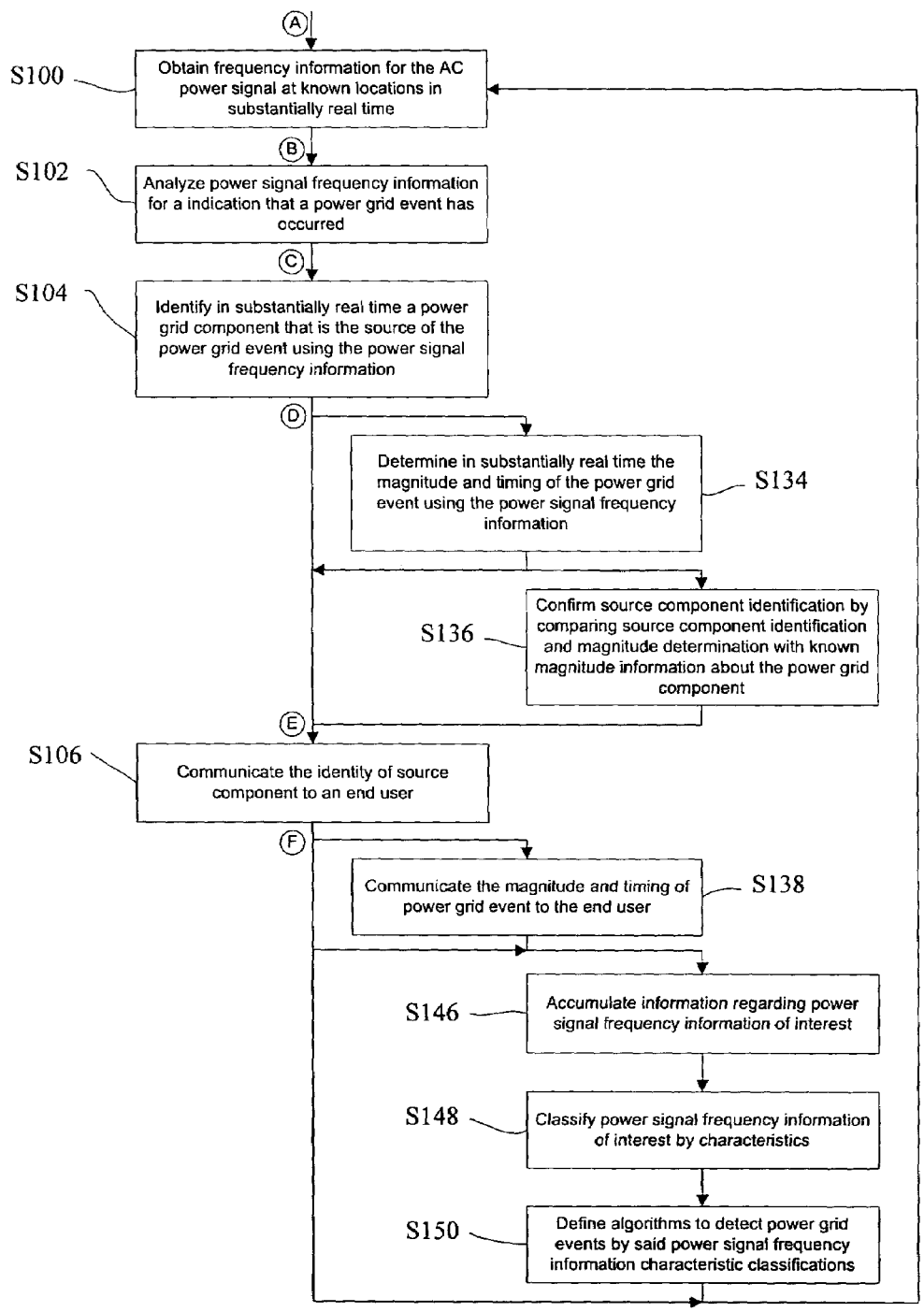
FIG. 5 through FIG. 10 are logic flow charts showing some of the steps of an exemplary method for substantially real-time monitoring of the operational dynamics of the components of an AC power grid.

In any event, once the appropriate mathematical frequency event detection and localization algorithms have been applied, a particular power grid event can be identified and monitored in substantially real-time. Once the digitized data associated with the monitoring of frequency at a particular power outlet is received at the central data center, the necessary computational analysis is carried out, preferably by a digital computer program, to identify in substantially real-time the power grid component that is the source of the power grid event. Additionally, the frequency information can be used to determine the magnitude, timing, and other characteristics of the power grid event. Thus, the method can also include, as shown in FIG. 5, the step of S134 determining in substantially real-time the magnitude and timing of the power grid event in substantially real-time using the power signal frequency information.

Returning now to FIG. 3, the system may also include a database 42 containing known magnitude information about the power grid components, such as the amount of power produced by a particular power plant or generator. The central data center 28 can then access the known magnitude information database 42 in order to confirm its source component identification by comparing the source component identification and magnitude determination with the known information. Thus, the central data center 28 can use the known magnitude information for that power grid component to verify its source component identification. This step is shown in FIG. 5 as step S136, confirming the source component identification by comparing the source component identification and magnitude determination with known magnitude information about the power grid component.

Figure 10:
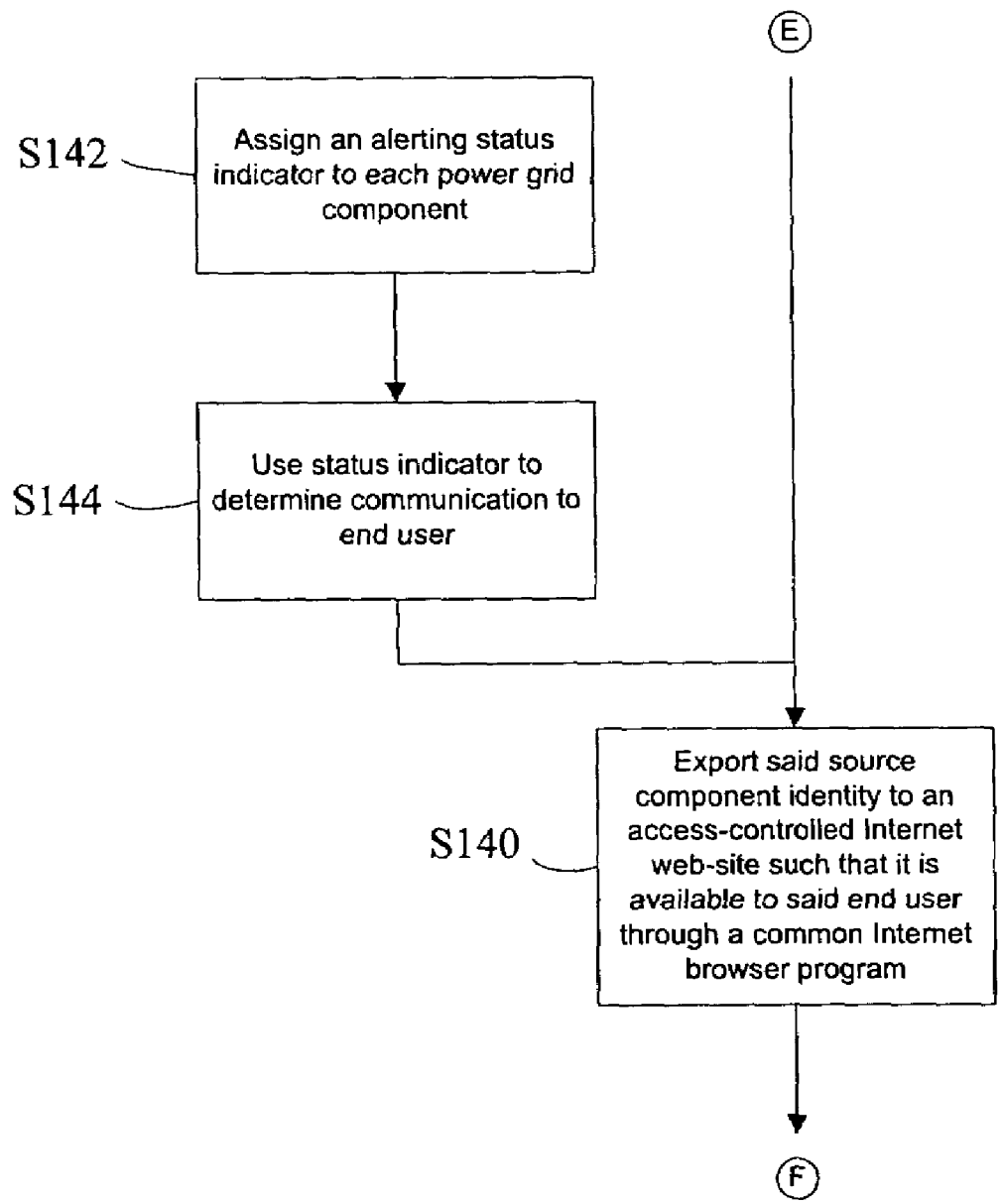

Returning again to FIG. 3, the identity of the power grid event source component, and other information such as magnitude and timing, is then communicated to one or more third parties or end users 44. Communicating this information is of primary concern to the end user 44. It is contemplated and preferred that such communication to third parties be through export of the data to an access-controlled Internet web site 46 such that it is available to end users through a common Internet browser program, such as Netscape Navigator® or Microsoft Internet Explorer®, but other communication methods may be employed to good effect. These steps are shown in FIG. 5 as steps S106 communicating the identity of the source component to an end user, and S138 communicating the magnitude and timing of the power grid event to the end user. Additional steps are shown in FIG. 10, including S140 exporting the source component identity to an access-controlled web-site such that it is available to the end user through a common browser program, S142 assigning an alerting status indicator to each power grid component, and S144 using the status indicator to determine communication to an end user. The importance of an alerting status indicator is that notifies end users immediately when a power grid event of pre-identified significance (based on magnitude, location, or other parameter) occurs. This information may be commercially valuable for transacting purchases or sales of energy commodities, for example, and end users benefit from receiving such information as quickly and clearly as possible.

Lastly, the system shown in FIG. 3 may also have a database 48 for storing power signal frequency information of interest. Through data accumulation and analysis, the specific frequency deviation characteristics can be matched to specific power grid event characteristics allowing a range of automated alerting algorithms to be defined which optimally detect different types of power grid event. Thus, as shown in FIG. 5, the exemplary method may further include the steps of: S146 accumulating information regarding power signal frequency information of interest; S148 classifying power signal frequency information of interest by characteristics; and S150 defining algorithms to detect power grid events by said power signal frequency information characteristic classifications.

One of ordinary skill in the art will recognize that additional configurations and steps are possible without departing from the teachings of the invention or the scope of the claims which follow. This detailed description, and particularly the specific details of the exemplary embodiments disclosed, is given primarily for clearness of understanding and no unnecessary limitations are to be understood therefrom, for modifications will become obvious to those skilled in the art upon reading this disclosure and may be made without departing from the spirit or scope of the claimed invention.

The invention claimed is:

1. A method for substantially real-time monitoring of the operational dynamics of a plurality of power grid components, which are physical entities associated with an AC power grid, comprising the steps of:
    obtaining power signal frequency information for the AC power signal at a plurality of known monitoring locations on said AC power grid in substantially real-time by connecting a frequency monitor to said AC power grid at each of said plurality of known monitoring locations;
    using a digital computer to analyze said power signal frequency information for an indication that a power grid event has occurred on said AC power grid;
    using a digital computer to identify in substantially real-time a power grid component of said AC power grid that is the source of the power grid event using said power signal frequency information; and
    communicating the identity of the source power grid component to a third party, such that the third party is able to know in substantially real-time the source of the power grid event.

2. The method of claim 1, wherein said step of obtaining power signal frequency information includes:

recording the AC power signal at each monitoring location;
transmitting each said recorded AC power signal to a central data center; and
determining the frequency of each said recorded AC power signal.

3. The method of claim 2, further comprising selecting said known monitoring locations such that there is at least one frequency monitor in exclusive proximity to each of the power grid components of said AC power grid.

4. The method of claim 3, further comprising encoding said recorded AC power signal with time information, and wherein said step of identifying said source power grid component includes:
ascribing said encoded time information from each frequency monitor to each power grid component; and
identifying the power grid component ascribed to the earliest time information for the power grid event as the source of the power grid event.

5. The method of claim 1, wherein said step of analyzing said frequency information includes:
determining the normal frequency distribution; and
setting frequency deviation alert boundaries from said normal frequency distribution.

6. The method of claim 1, wherein said step of analyzing said frequency information includes performing frequency data rate of change analysis.

7. The method of claim 1, wherein said step of analyzing said frequency information includes performing frequency deviation pattern recognition.

8. The method of claim 1, wherein the step of identifying the power grid component that is the source of the power grid event includes comparing said power signal frequency information to a model of said AC power grid to identify the power grid component that is the source of the power grid event.

9. The method of claim 8, further comprising predetermining a matrix of possible events as said AC power grid model.

10. The method of claim 9, further comprising using additional AC power grid dynamics information to refine said model of said AC power grid.

11. The method of claim 1, wherein the step of communicating the identity of the source power grid component to the third party further comprises exporting the identity of the source power grid component to an access-controlled Internet web-site such that it is available to said third party through a common Internet browser program.

12. The method of claim 11, further comprising:
assigning an alerting status indicator to each power grid component; and
using said alerting status indicator to determine the communication to the third party.

13. The method of claim 1, further comprising:
determining the magnitude and timing of the power grid event in substantially real-time using said power signal frequency information; and
communicating the magnitude and timing of the power grid event to said third party.

14. The method of claim 13, further comprising confirming the identity of the source power grid component by comparing the identity and magnitude determination with known magnitude information about said power grid component, thereby increasing the reliability of said component identification and magnitude determination.

15. The method of claim 1, further comprising selecting said known monitoring locations such that said locations provide a substantially unique identification of a set of power grid components.

16. The method of claim 1, further comprising selecting said known monitoring locations such that a reduced number of locations provide a substantially unique identification of a set of power grid components.

17. The method of claim 1, further comprising selecting at least one known location such that said at least one known location provides a substantially unique identification of a particular power grid component.

18. The method of claim 1, further comprising:
accumulating information regarding power signal frequency information of interest;
classifying power signal frequency information of interest by characteristics; and
defining algorithms to detect power grid events by said power signal frequency information characteristic classifications.

19. A system for substantially real-time monitoring of the operational dynamics of a plurality of power grid components, which are physical entities associated with an AC power grid, comprising:
a plurality of power system frequency monitors, each said frequency monitor connected to said AC power grid at a known monitoring location for obtaining power signal frequency information at said known location; and
a central data center for:
receiving said power signal frequency information from each of said frequency monitors in substantially real-time;
analyzing said power signal frequency information for an indication that a power grid event has occurred on said AC power grid;
identifying in substantially real-time a power grid component of said AC power grid that is the source of the power grid event; and
communicating the identity of the source power grid component to a third party, such that the third party is able to know in substantially real-time the source of the power grid event.

20. The system of claim 19, wherein each frequency monitor records the AC power signal at each location, and transmits the recorded AC power signal to the central data center, and wherein the central data center determines the frequency of each recorded AC power signal.

21. The system of claim 20, wherein the known monitoring locations are selected such that there is at least one frequency monitor in exclusive proximity to each of the power grid components of said AC power grid.

22. The system of claim 21, wherein each frequency monitor encodes the recorded AC power signal with time information, and wherein said central data center identifies the power grid component in exclusive proximity to the frequency monitor having the earliest time information for a power grid event as the source of the power grid event.

23. The system of claim 19, wherein the known monitoring locations are selected such that said locations provide a substantially unique identification of a set of power grid components.

24. The system of claim 19, wherein the known monitoring locations are selected such that a reduced number of locations provide a substantially unique identification of a set of power grid components.

25. The system of claim 19, wherein at least one known location is selected such that said at least one known location provides a substantially unique identification of a particular power grid component.

26. The system of claim 19, wherein said central data center has a model of said AC power grid, and wherein said central data center is further for comparing said power signal frequency information from each of said frequency monitors to said model of said AC power grid to identify the power grid event source component.

27. The system of claim 26, wherein said model of said AC power grid contains a predetermined matrix of possible events.

28. The system of claim 19, further comprising an access-controlled Internet web site accessible through an Internet browser program, wherein said central data center is further for exporting the identity of the source power grid component to said web site.

29. The system of claim 19, wherein said central data center is further for:
   determining the magnitude and timing of the power grid event in substantially real-time using said power signal frequency information; and
   communicating the magnitude and timing of the power grid event to said third party.

30. The system of claim 29, further comprising a database containing known magnitude information about said power grid components, wherein said central data center is further for confirming the identity of the source power grid component by comparing the identity and magnitude determination with known magnitude information about said power grid component, thereby increasing the reliability of said component identification and magnitude determination.

31. The system of claim 19, further comprising a database for storing power signal frequency information of interest, wherein said central data center is further for:
   accumulating information regarding power signal frequency information of interest in said database for storing power signal frequency information of interest;
   classifying power signal frequency information of interest by characteristics; and
   defining algorithms to detect power grid events by said power signal frequency information characteristic classifications.

32. The system of claim 19, wherein said third party does not otherwise have access to substantially real-time information about the operational dynamics of said power grid components.

33. The method of claim 1, wherein the source power grid component is one of the following: a power generating facility, a power transmission line, a voltage transformer, or a substation.

34. The method of claim 1, wherein the power grid event is one of the following: a trip at a power generating facility or a failure of a power transmission line.

35. The method of claim 2, wherein each frequency monitor is connected to said AC power grid through a power outlet.

36. The system of claim 19, wherein the source power grid component is one of the following: a power generating facility, a power transmission line, a voltage transformer, or a substation.

37. The system of claim 19, wherein the power grid event is one of the following: a trip at a power generating facility or a failure of a power transmission line.

38. A method for substantially real-time monitoring of the operational dynamics of a plurality of power grid components, which are physical entities associated with an AC power grid, comprising the steps of:
   measuring power grid frequency at a plurality of known monitoring locations on said AC power grid in substantially real-time by connecting a frequency monitor to said AC power grid through a power outlet at each monitoring location;
   using a digital computer to analyze the measured power grid frequencies for an indication that a power grid event has occurred on said AC power grid;
   using a digital computer to identify in substantially real-time a power grid component of said AC power grid that is the source of the power grid event based on the measured power grid frequencies and without direct access to the power grid components or operational data from the power grid components; and
   communicating the identity of the source power grid component to a third party, such that the third party is able to know in substantially real-time the source of the power grid event.

* * * * *